July 15, 1969     A. S. BROWN ET AL     3,455,078

METAL DOOR AND METHOD OF MAKING

Filed Oct. 19, 1966     2 Sheets-Sheet 1

INVENTORS
ARTHUR S. BROWN,
HAROLD E. LEIBY,
EARLE A. MILLER
BY WATTS & FISHER
ATTORNEYS

July 15, 1969    A. S. BROWN ET AL    3,455,078
METAL DOOR AND METHOD OF MAKING
Filed Oct. 19, 1966    2 Sheets-Sheet 2

INVENTORS
ARTHUR S. BROWN,
HAROLD E. LEIBY,
BY & EARLE A. MILLER
WATTS & FISHER
ATTORNEYS

United States Patent Office 3,455,078
Patented July 15, 1969

3,455,078
METAL DOOR AND METHOD OF MAKING
Arthur S. Brown, Girard, Harold E. Leiby, Southington, and Earle A. Miller, Warren, Ohio, assignors to The American Welding & Manufacturing Company
Filed Oct. 19, 1966, Ser. No. 587,903
Int. Cl. E06b 3/16
U.S. Cl. 52—619                                11 Claims

ABSTRACT OF THE DISCLOSURE

The present door invention comprises front and rear metal sheets connected together along their longitudinal edge portions and along their end portions to top and bottom closures and to the edges of interior parts, such as hinge and lock reinforcements, all by projection welds.

THE FIELD OF THE INVENTION

This invention relates generally to the steel door art. It is particularly concerned with a new projection welded door of the hollow metal construction type.

THE PRIOR ART

Prior hollow metal doors, so far as we are informed, have usually been made by separately welding each of the interior parts, such as hinge and lock reinforcements, in place on one of the sheets of metal, then assembling and welding the other sheet to the first sheet and to the interior parts. This procedure was slow and expensive because it required numerous separate welding steps, and the services of skilled welders, and in general, was conducive to faulty construction, as represented by breakage of some of the welds when the door was being erected in a building or after it had undergone some severe usage.

SUMMARY

The present invention avoids the disadvantages of the said prior art by means of new features of construction which enable semi-skilled workmen to make projection welded hollow metal doors which are substantially free from defective welds.

Briefly described, the present door invention comprises front and rear metal sheets projection welded along their longitudinal edge portions to each other and to hinge and lock reinforcements, and along their ends to top and bottom closures.

Briefly described, the present method invention includes the steps of punching and shearing metal sheets for interior parts, such as lock, hinge and other reinforcements, bending the longitudinal edge portions of the sheets and forming welding projections thereon, placing interior parts, such as hinge and lock reinforcements between the edge portions of the sheets, projection welding together the opposed longitudinal edge portions of the sheets and the interior parts, forming end closures with welding projections on each edge portion, assembling the closures between the top and bottom edge portions of the sheets and projection welding the edges of each closure to both of the sheets.

The present invention will be better understood by those skilled in the art from the following specification and the drawings which accompany it in which.

Figure 1:
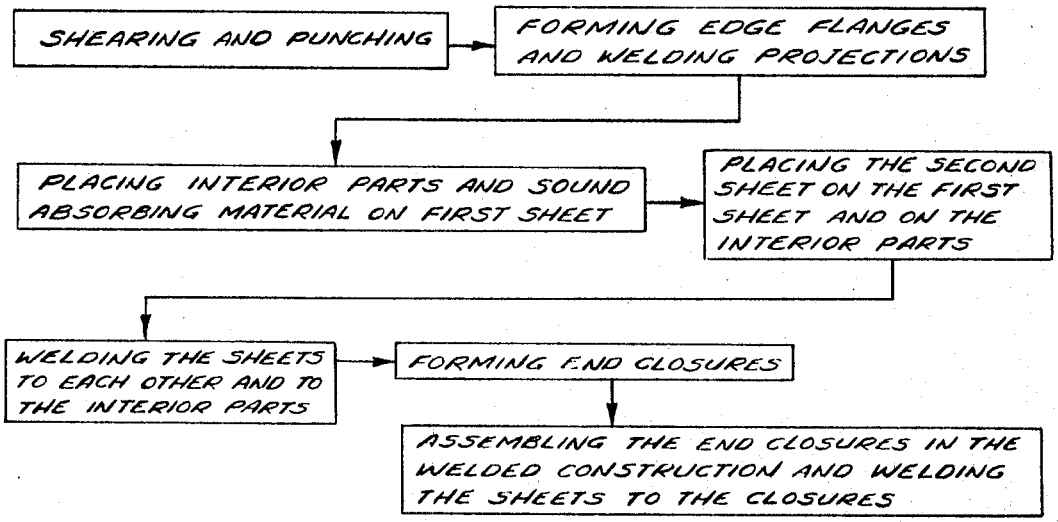
FIG. 1 is a flow diagram showing the successive steps of the present method invention.
Figure 2:
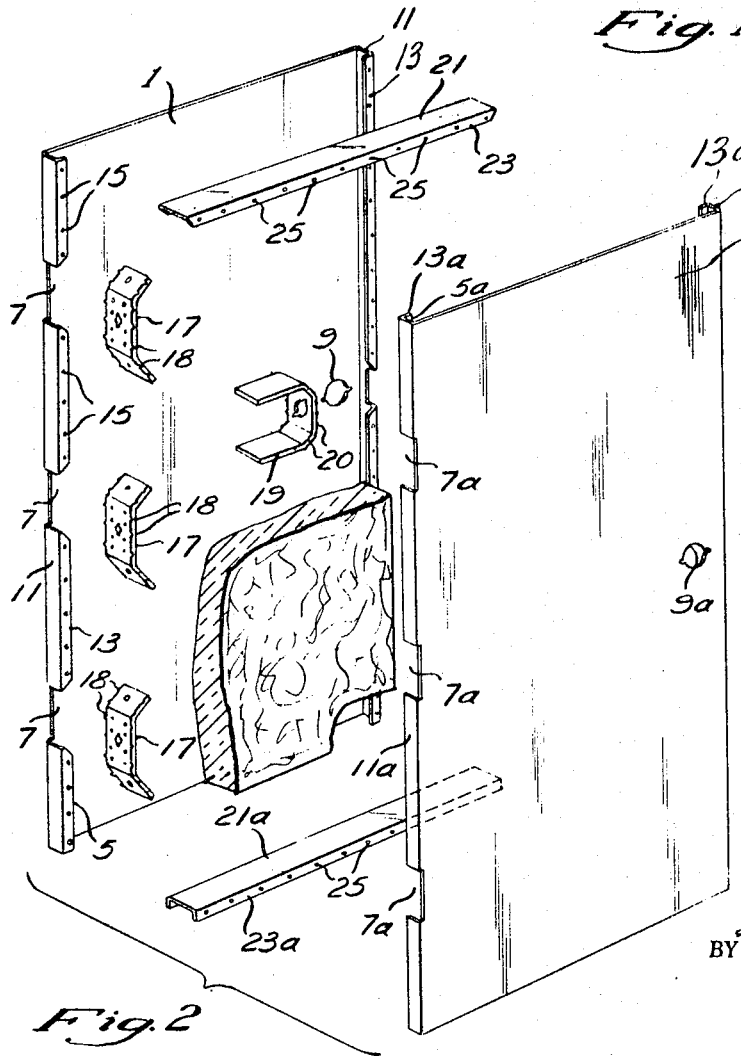
FIG. 2 is an exploded view of a door embodying the present article invention.

FIG. 1 shows the order of performance of the steps embodying this method invention and FIG. 2 shows the results of those steps. FIG. 1 indicates that the first step is that of shearing and punching two steel sheets 1 and 3, for use as the front and the rear sides of the door of FIG. 2. As is shown in FIG. 2, the longitudinal edges 5 and 5a of front and rear sheets 1 and 3 have been sheared to provide reliefs 7 and 7a for hinge reinforcements. Sheets 1 and 3 have also been punched as shown at 9 and 9a, respectively, for reception of a lock (not shown).

Figure 4:
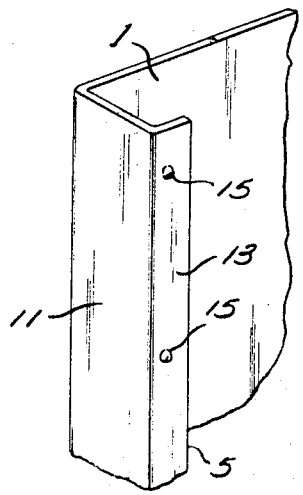
FIGS. 3 and 4 are, respectively, fragmentary, perspective views of the front and rear sides of the door of FIG. 2.
Figure 3:
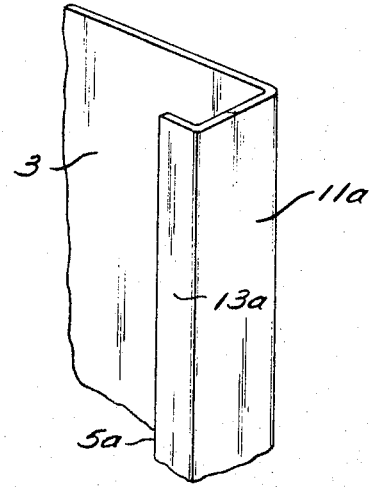
Figure 6:
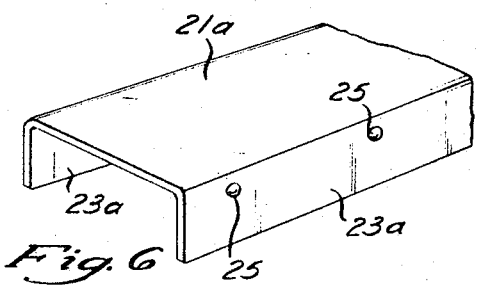
FIGS. 5 and 6 are, respectively, fragmentary, perspective views of the closures for the top and bottom ends of the door of FIG. 2.
Figure 5:
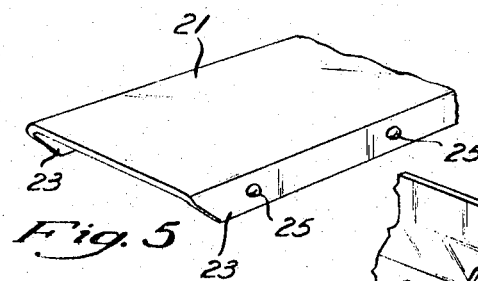

In the second step, as is better shown in FIGS. 3 and 4, the longitudinal edges of sheets 1 and 3 have been bent to form main flanges 11 and 11a, respectively, which extend at substantially right angles, or normal, to the sheets and short flanges 13 and 13a, respectively, which project toward one another from the free ends of flanges 11 and 11a. In the same operation, the short flanges 13 of sheet 1 have been provided with projection welding projections 15 which are spaced apart therealong and initially engage the short flanges 13a of sheet 3 when the two sheets are brought together preliminary to welding.

In the third step of the method, hinge reinforcements 17 are located in hinge reliefs 7 of sheet 1 with welding projections 18 engaging the sheet, and lock reinforcement 19 is properly positioned relative to punch holes 9. (See FIGS. 2, 7, 8 and 10.) Lock reinforcement 19 has welding projections 20 on its opposite edges. Also, sound deadening material (not shown), is placed on sheet 1 and substantially fills the space between the sheets, hinge and lock reinforcements.

In the fourth step, sheet 3 is placed on sheet 1 with the hinge reliefs 7a being positioned adjacent to hinge reinforcements 17 and with lock hole 9a being aligned with lock hole 9 of sheet 1.

In the fifth step the parts assembled in the fourth step are brought to a projection welding device where one longitudinal edge of the door is placed between welding electrodes and the short flanges 13 and 13a are welded together by welding current which initially flows through projections 15 and flange 13a. At the same time the hinge reinforcements and the sheets are welded together by current flowing through projections 18 on each side of 17 and sheets 1 and 3. In this step the other longitudinal edges of sheets 1 and 3 are similarly welded together and the sheets and lock reinforcement are welded together.

In the sixth step top and bottom end closures 21 and 21a (see FIGS. 2, 3, 4 and 10) are formed from strips of steel by bending the longitudinal edges to form flanges 23 and 23a, each of which is provided with welding projections 25. Flanges 23a on bottom closure 21a are longer than flange 23 of top closure 21 and are located to permit removal of metal for additional fitting, if required, of the bottom of the door to the floor or threshold beneath it.

In the seventh step, the top closure 21 is inserted between the top edges of sheets 1 and 3 of the product of the fifth step with flanges 23 extending into the space between the sheets and then this end of the door is brought between projection welding electrodes and the flanges on the closure 21 and sheets 1 and 3 are welded together. The bottom closure 21a is assembled between the bottom edges of sheets 1 and 3 with the flanges projecting outwardly and this end of the door is then brought between welding electrodes and the sheets and bottom closure are thereby welded together.

It will be understood from FIG. 2 that each of the main flanges 11 and 11a of sheets 1 and 3 and flanges 23 and 23a of closures 21 and 21a is substantially equal in width to one-half of the final desired thickness of the door. FIG. 2 also shows that each of the hinge reinforcements 17 and the lock reinforcement 19 is also substantially equal in width to the final desired outside thickness of the door minus the thickness of the sheets 1 and 3.

Figure 9:
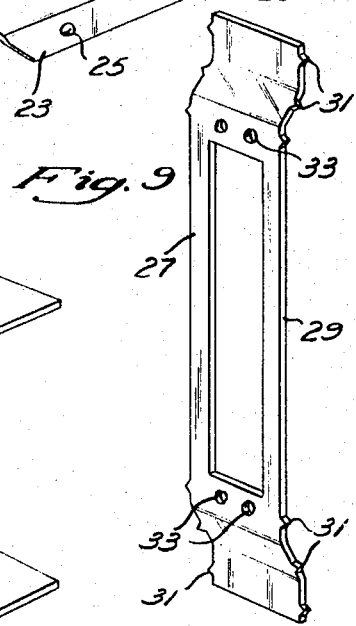
FIG. 9 is a perspective view of a flush bolt reinforcement for the lock edge of the door.
Figure 7:
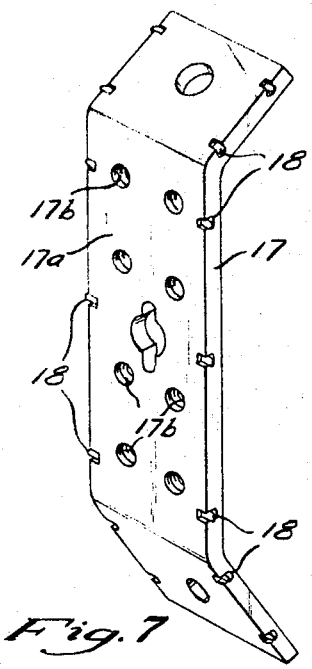
FIGS. 7 and 8 are, respectively, perspective views of hinge and lock reinforcements for the door of FIG. 2.
Figure 8:
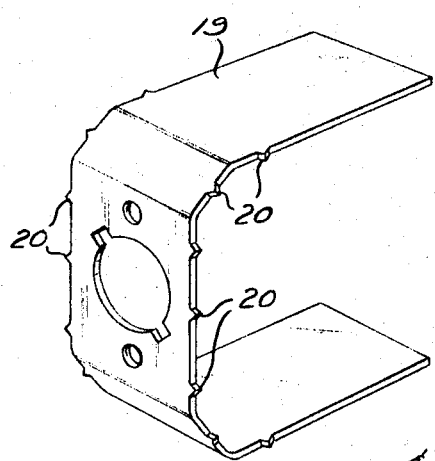

The flush bolt reinforcement 27 of FIG. 9 has a face portion 29 to close a corresponding space in the lock edge of the door, which is formed by notches (not shown) in the flanges of sheets 1 and 3, and has welded projections 31 on its edges for welding to the sheets. Tapped holes 33 near the ends of portion 29 are for screws (not shown) which secure a flush bolt (not shown) against the inner surface of the reinforcement with the bolt being movable through portion 29.

Reinforcement 27 is one of several reinforcements which may be used for different purposes and what may have different shapes but all of which will have projecting welding projections on their edges for welding to the door sheets.

Figure 10:
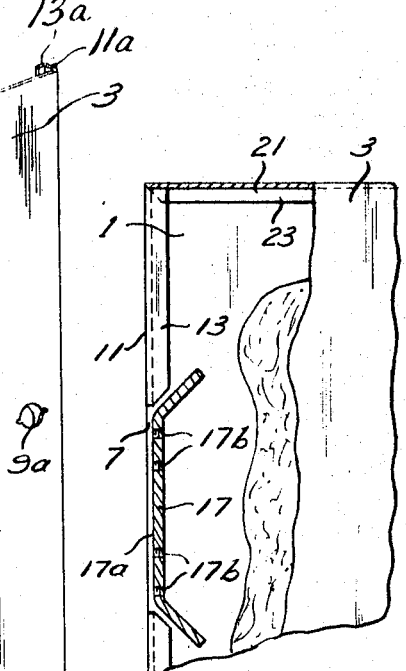
FIG. 10 is a fragmentary, sectional view showing a hinge reinforcement in position in a door.

FIG. 10 shows the relative positions of a hinge reinforcement and one sheet of the door. The reinforcement 17 is welded, as stated above to sheets 1 and 3 and its surface 17a is exposed through reliefs 7 and 7a and it is set back far enough into the door from the outer surfaces of flanges 11 and 11a to afford space for a hinge leaf. Threaded holes 17b are provided for screws which extend through a hinge leaf and secure it to the reinforcement 17.

The present method invention may be performed mechanically by semi-skilled labor in line production. As a result, doors embodying the present article invention may be made quickly and at lost cost from thin gauge steel sheets and inner parts of somewhat greater thickness.

Having thus described this invention in such full, clear, concise and exact terms as to enable any person skilled in the art to which it pertains to make and use the same, and having set forth the best mode contemplated of carrying out this invention, we state that the subject matter which we regard as being out invention, is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A hollow metal door comprising front and rear flat metal sheets having main opposed flanges extending along their longitudinal edges and at substantially right angles to the sheets, shorter flanges projecting toward each other from the main flanges, a plurality of spaced apart welding projections formed on the shorter flanges of at least one of the front and rear metal sheets and extending toward opposed flanges when assembled prior to welding, the main and shorter flanges on one edge of each of the front and rear sheets being cut away to form at least one open space to accommodate at least one interior part, at least one interior part positioned in said at least one space, said at least one interior part having welding projections formed on at least one edge and extending toward at least one of said front and rear sheets, and projection welds connecting said flanges and connecting said at least one interior part to said at least one of said front and rear sheets and including metal of said projections melted during welding.

2. The door set forth in claim 1, wherein there is a plurality of open spaces and a corresponding plurality of interior parts positioned therein.

3. The door set forth in claim 1, in which top and bottom channel-shaped short metal closures having parallel longitudinal edge portions are disposed between the transverse ends of said sheets and welding projections are spaced along the opposed side surfaces of the edge portions of the closures adjacent the front and rear sheets for welding thereto.

4. The door set forth in claim 2, in which top and bottom channel-shaped short metal closures having parallel longitudinal edge portions are disposed between the transverse ends of said sheets and welding projections are spaced along the opposed side surfaces of the edge portions of the closures adjacent the front and rear for welding thereto.

5. The door set forth in claim 2, wherein said interior parts are hinge reinforcements.

6. The door set forth in claim 4, wherein said interior parts are hinge reinforcements.

7. The door set forth in claim 1, wherein said at least one interior part is a lock reinforcement.

8. The door set forth in claim 3, wherein said at least one interior part is a lock reinforcement.

9. The door set forth in claim 1, further including sound deadening material disposed between the front and rear sheets of the door.

10. The door set forth in claim 5, further including sound deadening material disposed between the front and rear sheets of the door.

11. The door set forth in claim 6, further including sound deadening material disposed between the front and rear sheets of the door.

References Cited

UNITED STATES PATENTS

| | | | |
|---|---|---|---|
| 985,912 | 3/1911 | Lindros | 52—455 |
| 1,061,993 | 5/1913 | Emrich | 52—455 |
| 1,270,014 | 6/1919 | Conwell | 52—455 X |
| 1,748,195 | 2/1930 | Stevens | 52—455 |
| 2,248,777 | 7/1941 | Peelle et al. | 52—619 |
| 2,696,279 | 12/1954 | Schofield | 52—619 X |
| 2,717,062 | 9/1955 | Dusing et al. | 52—619 X |
| 3,333,385 | 8/1967 | King | 49—489 X |
| 2,814,717 | 11/1957 | Hardesty | 287—189.36 |

FOREIGN PATENTS 937,393   1/1956   Germany.

DENNIS L. TAYLOR, Primary Examiner

U.S. Cl. X.R.

52—620